US012530773B1

United States Patent
Gupta et al.

(10) Patent No.: US 12,530,773 B1
(45) Date of Patent: Jan. 20, 2026

(54) METHODS AND APPARATUS FOR GENERATING THREE-DIMENSIONAL REPRESENTATIONS OF SERIAL SECTIONS

(71) Applicant: Pramana, Inc., Cambridge, MA (US)

(72) Inventors: Raghubansh Bahadur Gupta, Bangalore (IN); Jaya Jain, Shahpura (IN); Arun Koushik Parthasarathy, Bengaluru (IN); Abhishek Garhia, Vadodara (IN); Bharathwaj Raghunathan, Ontario (CA); Prasanth Perugupalli, Cary, NC (US); Shilpa G. Krishna, Kerala (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 19/243,464

(22) Filed: Jun. 19, 2025

(51) Int. Cl.
| | |
|---|---|
| G06T 7/00 | (2017.01) |
| G06T 7/33 | (2017.01) |
| G06T 7/62 | (2017.01) |
| G06V 10/44 | (2022.01) |
| G06V 20/69 | (2022.01) |
| G16H 30/20 | (2018.01) |
| G16H 30/40 | (2018.01) |

(52) U.S. Cl.
CPC ............ G06T 7/0012 (2013.01); G06T 7/33 (2017.01); G06T 7/62 (2017.01); G06V 10/44 (2022.01); G06V 20/695 (2022.01); G16H 30/20 (2018.01); G16H 30/40 (2018.01); G06T 2207/20084 (2013.01); G06T 2207/30024 (2013.01); G06T 2207/30096 (2013.01)

(58) Field of Classification Search
None
See application file for complete search history.

(56) References Cited

U.S. PATENT DOCUMENTS

2007/0280517 A1 * 12/2007 De La Torre-Bueno ................... G06T 7/33
382/128

OTHER PUBLICATIONS

Kiemen, Ashley L., et al. "Tissue clearing and 3D reconstruction of digitized, serially sectioned slides provide novel insights into pancreatic cancer." Med 4.2 (2023): 75-91. (Year: 2023).*

Kugler, Mauricio, et al. "Robust 3D image reconstruction of pancreatic cancer tumors from histopathological images with different stains and its quantitative performance evaluation." International journal of computer assisted radiology and surgery 14.12 (2019): 2047-2055. (Year: 2019).*

(Continued)

*Primary Examiner* — Samah A Beg
(74) *Attorney, Agent, or Firm* — Caldwell Intellectual Property Law

(57) ABSTRACT

An apparatus an method for generating three-dimensional representations of serial sections, wherein the method includes creating a plurality of slide images using a slide scanner, the slide scanner comprising an image sensor and a stage, receiving, using at least a processor, the plurality of slide images from the slide scanner, extracting, using the at least a processor, a plurality of features from the plurality of serial slide section images using a feature extraction algorithm, registering, using the at least a processor, the plurality of serial slide section images as a function of the plurality of feature, generating, using the at least a processor, a three-dimensional (3D) stack view, wherein the 3D stack view comprises the plurality of serial slide section images, and displaying the 3D stack view through a display device.

24 Claims, 10 Drawing Sheets

(56) References Cited

OTHER PUBLICATIONS

Onozato, Maristela L., et al. "A role of three-dimensional (3D)-reconstruction in the classification of lung adenocarcinoma." Analytical cellular pathology 35.2 (2012): 79-84. (Year: 2012).*
Song, Yi, et al. "3D reconstruction of multiple stained histology images." Journal of pathology informatics 4.2 (2013): 7. (Year: 2013).*

* cited by examiner

METHODS AND APPARATUS FOR GENERATING THREE-DIMENSIONAL REPRESENTATIONS OF SERIAL SECTIONS

FIELD OF THE INVENTION

The present invention generally relates to the field of slide visualization. In particular, the present invention is directed to methods and apparatus for generating three-dimensional representations of serial sections.

BACKGROUND

In histopathology, and other medical slide fields, blocks of tissue are often separated into serial sections. These serial sections may represent sections taken throughout the thickness of the tissue block. However, the visualization of these serial sections can be challenging, as it requires users and clinicians to overlay multiple images in their mind to visualize the tissue block. Existing methods do not provide an automated method for creating visualizations of serial sections.

SUMMARY OF THE DISCLOSURE

In some aspects, an apparatus is described for generating three-dimensional representations of serial sections, wherein the apparatus includes: a slide scanner, the slide scanner including an image sensor and a stage, wherein the slide scanner is configured to create a plurality of slide images; a memory; and at least a processor communicatively connected to the memory and the slide scanner, wherein the memory contains instructions configuring the at least a processor to: receive the plurality of slide images from the slide scanner, wherein the plurality of slide images includes a plurality of serial slide section images; extract a plurality of features from the plurality of serial slide section images using a feature extraction algorithm; register the plurality of serial slide section images as a function of the plurality of features, wherein registering the plurality of serial slide section images as a function of the plurality of features includes: identifying a common feature between a portion of the plurality of serial slide section images; and aligning the portion of the plurality of serial slide section images as a function of the common feature; generate a three-dimensional (3D) stack view, wherein the 3D stack view includes the plurality of serial slide section images; and display the 3D stack view through a display device.

In some aspects, method is described for generating three-dimensional representations of serial sections, wherein the method includes: creating a plurality of slide images using a slide scanner, the slide scanner including an image sensor and a stage; receiving, using at least a processor, the plurality of slide images from the slide scanner, wherein the plurality of slide images includes a plurality of serial slide section images; extracting, using the at least a processor, a plurality of features from the plurality of serial slide section images using a feature extraction algorithm; registering, using the at least a processor, the plurality of serial slide section images as a function of the plurality of features, wherein registering the plurality of serial slide section images as a function of the plurality of features includes: identifying a common feature between a portion of the plurality of serial slide section images; and aligning the portion of the plurality of serial slide section images as a function of the common feature; generating, using the at least a processor, a three-dimensional (3D) stack view, wherein the 3D stack view includes the plurality of serial slide section images; and displaying the 3D stack view through a display device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating three-dimensional representations of serial sections. Aspects of the present disclosure allow for visualization of serial sections using a 3D stack view. This may allow for clinicians or other users to easily view tissue changes through the serial sections, allowing for better diagnosis and treatment of diseases. Aspects of the current disclosure allow for feature recognition and registration among serial section images. This may allow for the automated generation of the 3D stack view. Aspects of the current disclosure allow for easy calculation of tissue volume metrics, including through the intuitive use of a graphical user interface. In some embodiments, this may use features extracted through feature recognition.

Figure 1:
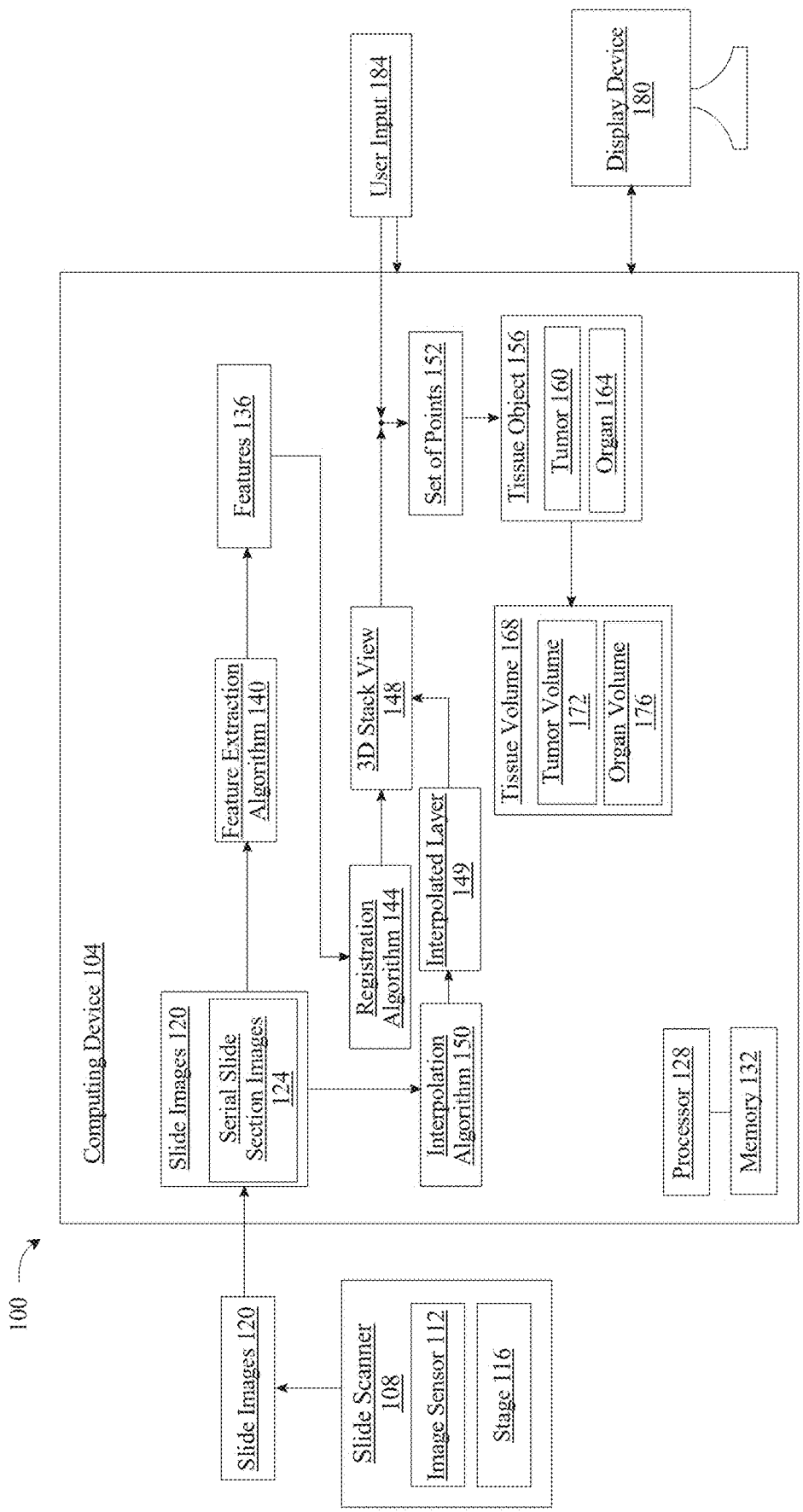
FIG. 1 is a box diagram of an exemplary embodiment of apparatus for generating three-dimensional representations of serial sections.

Referring now to FIG. 1, an exemplary embodiment of apparatus 100 for generating three-dimensional representations of serial sections is illustrated. Apparatus 100 may include circuitry such as without limitation a processor communicatively connected to a memory; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks, computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a slide scanner 108. A "slide scanner," for the purposes of this disclosure, is a device configured to generate images of slides. In an embodiment, slide scanner 108 may convert an optical image into an electronic signal, which can then be processed, stored, or displayed, as described in detail below. For example, and without limitation, imaging device as described herein, in some cases, may be used specialized for use in medical diagnostics under clinical setting, e.g., a microscope configured to capture detailed, high-resolution images of microscopic subjects to enable accurate diagnosis, disease monitoring, and any other biological research. In a non-limiting example, slide scanner 108 may be consistent with any imaging device as described in U.S. patent application Ser. No. 18/226,058, filed on Jul. 25, 2023, and entitled "IMAGING DEVICE AND A METHOD FOR IMAGE GENERATION OF A SPECIMEN," the entirety of which is incorporated herein by reference.

With continued reference to FIG. 1, slide scanner 108 includes a stage 116 configured to receive and hold slide. As used in this disclosure, a "stage" is a flat platform on which slide or specimen is placed for examination. In some embodiments, stage 116 may be an even surface without significant bumps, depressions, or curvatures. In some cases, stage may include a slide port having one or more alignment features, wherein the "alignment features" are physical features that help to secure received slide in place and/or align a slide with another component of slide scanner 108 as described herein. In some embodiments, alignment features may include a component which keeps slide secure, such as a clamp, latch, clip, recessed area, or another fastener. In some embodiments, stage 116 may allow for easy removal or insertion of slide. In some embodiments, stage 116 may include a transparent surface through which light may travel. In some embodiments, slide may rest on and/or may be illuminated by light traveling through such a transparent surface of stage. In some embodiments, stage 116 may be mechanically connected to an actuator mechanism as described below. In some embodiments, the stage 116 is configured to move the slide relative to the optical system. As a non-limiting example, stage 116 may move the slide closer to or farther from optical system. As a non-limiting example, stage 116 may move the optical system closer to or farther from slide.

Still referring to FIG. 1, in some cases, slide scanner 108 may include a scanner actuator mechanism. As used herein, a "scanner actuator mechanism" is a mechanical component configured to change the position of a slide relative to an optical system. In a non-limiting example, actuator mechanism may be configured to precisely move stage in the X, Y, and/or even Z directions, allowing for detailed examination of different part of the specimen. In one or more embodiments, actuator mechanism may be used to alter line of sight so that an image of slide may be captured, as discussed further in this disclosure. In some embodiments, actuator mechanism may be mechanically connected to slide, such as slide in slide port. In some embodiments, actuator mechanism may be mechanically connected to slide port. For example, actuator mechanism may move slide port in order to move slide. For example, and without limitation, actuator mechanism may move slide port so that a distance D between a top surface of slide and an optical component as described below varies.

With continued reference to FIG. 1, in some embodiments, actuator mechanism may also vary an angle between top surface (e.g., surface directed toward, or facing, optical system and that the slide and/or specimen contacts) and ground. In some embodiments, actuator mechanism may be mechanically connected to a mobile element (i.e., any movable or portable object, component, and device) within slide scanner 108 such as, without limitation, slide, slide port, stage, or an optical system as described in detail below. In some embodiments, actuator mechanism may be configured to change the relative position of slide and optical system by moving stage, slide, and/or optical system in X, Y, and/or Z directions during slide scanning and/or re-scanning process as described in detail below.

Still referring to FIG. 1, in some embodiments, actuator mechanism may include a hydraulic actuator. A hydraulic actuator may consist of a cylinder or fluid motor that uses hydraulic power to facilitate mechanical operation. Output of hydraulic actuator mechanism may include mechanical motion, such as without limitation linear, rotatory, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. "Single acting" may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. "Double acting" may be used when pressure is applied substantially on each side of a piston; any difference in resultant force between the two sides of the piston causes the piston to move.

Still referring to FIG. 1, in some embodiments, actuator mechanism may include a pneumatic actuator mechanism. In some cases, a pneumatic actuator may enable considerable forces to be produced from relatively small changes in gas pressure. In some cases, a pneumatic actuator may respond more quickly than other types of actuators such as, for example, hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism may include an electric actuator. Electric actuator mechanism may include any of electromechanical actuators, linear motors, and the like. In some cases, actuator mechanism may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism may include a mechanical actuator mechanism. In some cases, a mechanical actuator mechanism may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

With continued reference to FIG. 1, slide scanner 108 may include an optical system. As used in this disclosure, an "optical system" is an arrangement of one or more components which together act upon or employ electromagnetic radiation, such as light (e.g., visible light, infrared light, UV light, or the like). Optical system may include one or more optical components, wherein each "optical component," as described herein, refers to any device or part of a device that manipulates, interacts with, or is affected by light. In a non-limiting example, optical components may include lenses, mirrors, windows, filters, and the like. In some cases, optical system may form an optical image that corresponds to an optical object. For instance, and without limitation, optical system may form an optical image at or upon an image sensor 112, which can capture, e.g., digitize, the optical image as described in detail below. In some cases, optical system may have at least a magnification. For instance, and without limitation, optical system may include an objective (e.g., microscope objective) and one or more reimaging optical elements that together produce an optical magnification as described in detail below. In some cases, a degree of optical magnification may be referred to herein as zoom.

Still referring to FIG. 1, in some cases, optical system may include a light source. As used in this disclosure, a "light source" is any device configured to emit electromagnetic radiation. In some embodiments, light source may emit a light having substantially one wavelength. In some embodiments, light source may emit light having a wavelength range. Light emitted by light source as described herein may include, without limitation, ultraviolet light, visible light, and/or infrared light. In non-limiting examples, light source may include a light-emitting diode (LED), an organic LED (OLED) and/or any other light emitter. Such light source may be configured to illuminate slide and/or specimen on slide port and/or stage. In a non-limiting example, light source may illuminate slide and/or specimen on slide port and/or stage from below. In another non-limiting example, light source may illuminate slide and/or specimen from above.

With continued reference to FIG. 1, in some cases, light source may be connected to one or more optical components as described herein such as, without limitation, a condenser lens (i.e., an optical component used to focus and condense light emitted by light source onto slide and/or specimen). In some cases, condenser lens may be configured to focus and uniformly distribute light so that slide and/or specimen is evenly illuminated, thereby enhancing the resolution and contrast of the image. In a non-limiting example, optical component such as condenser lens may gather and focus light emitted from light source into a cone of light that illuminate slide and/or specimen with uniform intensity over the entire viewable area. In some cases, condenser lens may include an aperture diaphragm, e.g., a variable opening that may be adjusted to control the amount of light reaching slide and/or specimen. In some cases, adjusting such diaphragm may influence the contrast and depth of field in the image.

With continued reference to FIG. 1, in some cases, optical component may also include an objective lens. As used in this disclosure, an "objective lens" is an optical component that gathers light from slide and/or specimen and focuses it to produce optical image inside slide scanner 108. In some embodiments, produced optical image may be magnified by eyepiece lens for viewing by a human operator or captured by image sensor 112 as described in detail below for slide scanning and/or digital imaging. In some embodiments, optical system may include three objective lenses, wherein each objective lens may include various magnifications, ranging from 4× to 100× or even beyond. In some cases, magnification may be inscribed on the optical component casing. In some embodiments, optical components may include different numerical apertures (NA) that measure lens's ability to gather light and resolve slide and/or specimen detail at a fixed object distance. For example, and without limitation, a higher NA may indicate better resolving power. Exemplary types of objective lens may include, without limitation, dry objectives, immersion objectives, water immersion objectives, and/or the like.

Still referring to FIG. 1, in some embodiments, one or more optical components within optical system may be mounted on a nosepiece of slide scanner 108. As used in this disclosure, a "nosepiece" is a part of slide scanner that holds multiple optical components e.g., a plurality of objective lenses. In some cases, nosepiece may include a revolving nosepiece (also known as a turret), wherein the revolving nosepiece may include a rotatable component located head portion of slide scanner 108 and configured to hold multiple objective lenses. Optical components may be quickly and efficiently switched from one another using the revolving nosepiece during imaging of plurality of slides. In some embodiments, optical system may be parfocal; for instance, and without limitation, when a first objective lens is in focus, switching to a second objective lens or a third objective lens may require minimal refocusing. In some cases, plurality of optical components may be spaced out at a consistent distance on the revolving nosepiece and each optical component may be at a consistent distance from stage.

With continued reference to FIG. 1, it should be noted that the number of optical components within optical system as described above is illustrative and should not be restrictive. The actual number of optical components may vary, and optical system may incorporate greater or fewer optical components as needed. As an ordinary person skilled in the art, upon reviewing the entirety of this disclosure, will be aware of various modifications, adaptations, and alternative configurations that can be applied to optical system and optical components as described herein.

With continued reference to FIG. 1, slide scanner 108 includes an image sensor 112. As used herein, an "optical sensor" is a device that measures light and converts the measured light into one or more signals. One or more signals may include, without limitation, one or more electrical signals. Slide scanner 108 includes image sensor 112. In some embodiments, image sensor 112 may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, image sensor 112 may include a plurality of photodetectors. Image sensor 112 may include, without limitation, a camera. Image sensor 112 may be in electronic communication with a computing device as described in detail throughout this disclosure. As used herein, "electronic communication" as used in this disclosure is a shared data connection between two or more devices. In some embodiments, optical system may include two or more optical sensors XXX. In some cases, image sensor 112 may be disposed adjacent to optical components. In a non-limiting example, image sensor 112 may be mounted on nosepiece as described above. In another non-limiting example, image sensor 112 may be installed inside the head portion of slide scanner 108, above optical components.

Still referring to FIG. 1, in some embodiments, at least one image sensor 112 may include a camera. In some cases, a camera may include one or more optics as described herein such as, without limitation, spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of specimen on slide. In some embodiments, one or more of such settings may be configured based on a parameter set (i.e., a set of values, such as without limitation, quantitative and/or numerical values that identify how image is to be captured), such as any parameter set as disclosed in U.S. patent application Ser. No. 18/226,058. In some embodiments, camera may capture images at a low depth of field. In some embodiments, slide scanner 108 may be consistent with any imaging device disclosed in U.S. Non-provisional application Ser. No. 18/660,687, filed on May 10, 2024, and entitled "A SYSTEM AND METHOD FOR HOT-SWAPPING OF SCANNER ENTITIES INTO A CLUSTER," the entirety of which is incorporated herein by reference.

With continued reference to FIG. 1, slide scanner 108 is configured to create a plurality of slide images 120. In some embodiments, slide scanner 108 may image slide using image sensor 112 in order to create a slide image 120. In some embodiments, slides may include photographic slides, histological slides, tissue slides, blood cell slides, medical slides, and the like. In some embodiments, slide scanner 108 may be configured to scan a plurality of slides in a batch. In some embodiments, slides may include serial section slides. For the purposes of this disclosure, a "serial section slide" is a slide from a serial section. A "serial section," for the purposes of this disclosure, is a thin section of a specimen of a series of thin sections of a specimen. As a non-limiting example serial sections may be taken from a block of tissue, such that the serial sections represent cross sections of the tissue at regular intervals along its thickness. These serial selections may be mounted on slides in order to create serial section slides. In some embodiments, slide scanner 108 may be configured to image a plurality of serial section slides in order to create a plurality of serial slide section images 124. A "serial slide section image," for the purposes of this disclosure, is a digital image representation of a serial section slide. In some embodiments, plurality of serial slide section images 124 may include a plurality of slide images 120 of a single tissue block. For example, single tissue block may include a tissue block including a tumor. For example, single tissue block may include a tissue block including an organ or portion of an organ. For example, single tissue block may include an object of analysis.

With continued reference to FIG. 1, in an embodiment, slide images 120 may be taken with between 2× and 50× magnification. In some embodiments, slide images 120 include images taken at 10× magnification. In some embodiments, slide images 120 include images taken at 20× magnification. In some embodiments, slide images 120 include images taken at 40× magnification. In some embodiments, slide images 120 may be taken between 10× and 45× magnification. In some embodiments, slide images 120 may be taken on a range (inclusive) between 20× and 40× magnification. In some embodiments, slide images 120 may include macro images. As used in this disclosure, a "macro image" is a high resolution, large-scale image that captures detailed structural features.

With continued reference to FIG. 1, apparatus 100 and/or computing device 104 includes at least a processor 128. Apparatus 100 and/or computing device 104 includes memory 132. Memory 132 contains instructions configuring at least a processor 128 to receive a plurality of slide images 120 from the slide scanner 108. In some embodiments, processor 128 may be communicatively connected to slide scanner 108. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. In some embodiments, processor 128 may receive slide images 120 from slide scanner 108 using a wired connection. Wired connections may include, as non-limiting examples, universal serial bus (USB) connections, firewire, ethernet, coax connections, optical connections, fiber optic connections, and the like. In some embodiments, processor 128 may receive slide images 120 from slide scanner 108 using a wireless connection. Wireless connection may include, as non-limiting examples, Bluetooth, Wifi, NFC, Radio, line-of-sight communication, cellular communication, 2G, 3G, 4G, LTE, 5G, and the like.

With continued reference to FIG. 1, memory 132 includes instructions configuring the at least a processor 128 to extract a plurality of features 136 from the plurality of serial slide section images 124 using feature extraction algorithm 140. As used in this disclosure, "features" are distinguishable elements within an image that may be computationally detected to support image analysis. Without limitation, the features 136 may include cell boundaries, vascular structures, staining intensities, tissue interfaces, morphological landmarks, organ boundaries, tumor boundaries, and the like. A "feature recognition algorithm," for the purposes of this disclosure is a computational method configured to extract specific patterns, structures, or characteristics from input data.

With continued reference to FIG. 1, feature extraction algorithm 140 may include a scale invariant feature transform (SIFT) algorithm. SIFT is renowned for its ability to detect and describe local features in images, maintaining invariance to changes in scale and rotation. This robustness makes it highly effective for object recognition and image matching tasks.

With continued reference to FIG. 1, the SIFT algorithm may include four primary stages. A first step may include scale space peak selection. Scale space peak selection may involve identifying potential feature locations by constructing a scale-space representation of the image. The image may undergo Gaussian blurring at multiple scales, organized into octaves, each containing progressively blurred images. The Difference of Gaussians (DoG) is then computed by subtracting consecutive blurred images within each octave. Local extrema in these DoG images are identified as potential keypoints, representing candidates for stable features across different scales.

With continued reference to FIG. 1, another step of a SIFT algorithm may include key point Localization: After detecting potential key points, this step may refine their positions to enhance accuracy. It may include eliminating key points with low contrast or those situated along edges, as they are less stable and reliable. Techniques such as Taylor series expansion may be employed to achieve precise localization, ensuring that only key points with significant contrast and well-defined positions are retained.

With continued reference to FIG. 1, a further step of a SIFT algorithm may include orientation assignment: For each key point, one or more orientations may be assigned based on local image gradients. This process allows key point descriptors to remain invariant to image rotation. By analyzing the gradient directions and magnitudes within a region around each key point, the algorithm may determine the dominant orientations, facilitating consistent description regardless of the keypoint's orientation in the image.

With continued reference to FIG. 1, SIFT algorithm may include a step including creating a descriptor for each key point. This descriptor may encapsulate the local gradient information around the key point, typically resulting in a 128-dimensional vector. These descriptors may be designed to be highly distinctive and invariant to various transformations, enabling reliable matching of key points across different images.

With continued reference to FIG. 1, feature extraction algorithm 140 may include canny edge detection. Canny edge detection may be used to identify edges in images by following a multi-stage process designed to meet specific criteria. For example, the criteria may include low error rate (e.g., accurate edge detection with minimal false positives), precise localization (e.g., edges detected as close as possible to their true positions), and minimal response (e.g., each edge should be marked only once). In some embodiments, Canny edge detection may include a step of gaussian filtering. In gaussian filtering, the image can be smoothed using a Gaussian filter to reduce noise and unwanted details. In some embodiments, Canny edge detection may include a step of intensity gradient calculation: In intensity gradient calculation, the intensity gradients of the image may be computed to identify regions with sharp intensity changes, indicating potential edges. In some embodiments, Canny edge detection may include non-maximum suppression: Non-maximum suppression may include thinning the edges by retaining only the local maxima in the gradient magnitude, effectively highlighting the most significant edge pixels. In some embodiments, Canny edge detection may include double thresholding: In double thresholding, two thresholds may be applied to classify edge pixels into strong, weak, or non-relevant categories based on their gradient magnitudes. In some embodiments, Canny edge detection may include edge tracking by hysteresis: In edge tracking by hysteresis, weak edge pixels may be preserved if they are connected to strong edge pixels, ensuring that legitimate edges are retained while isolated weak edges are suppressed.

With continued reference to FIG. 1, in some embodiments feature extraction algorithm 140 may include, as non-limiting examples, Harris corner detection, speeded-up robust features (SURF), features from accelerated segment test (FAST), binary robust independent elementary features (BRIEF), Oriented FAST and Rotated BRIEF (ORB), and the like.

With continued reference to FIG. 1, in some embodiments extracting the plurality of features from the plurality of serial slide section images using the feature extraction algorithm may include extracting the plurality of features from the plurality of serial slide section images using a deep neural network (DNN). In some embodiments, feature extraction algorithm 140 may include a deep neural network (DNN). As used in this disclosure, a "deep neural network" is defined as a neural network with two or more hidden layers. Neural network is described in further detail below with reference to FIGS. 7 and 8. In a non-limiting example, feature extraction algorithm 140 may include a convolutional neural network (CNN). Extracting a plurality of features 136 from the plurality of serial slide section images 124 using feature extraction algorithm 140 may include training CNN using training data comprising, for example, a plurality of slide images, and extracting a plurality of features 136 from the plurality of serial slide section images 124 using feature extraction algorithm 140 using the trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., slide images through a sliding window approach. In some cases, convolution operations may enable processor 128 to detect local/global patterns, edges, textures, and any other features described herein within slide images. Spatial features may be passed through one or more activation functions, such as without limitation, Rectified Linear Unit (ReLU), to introduce non-linearities into the processing step of extracting a plurality of features 136 from the plurality of serial slide section images 124 using feature extraction algorithm 140. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying down-sampling, such as max-pooling or average pooling, to small, non-overlapping regions of one or more features.

Still referring to FIG. 1, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, plurality of features 136. Further, each fully connected layer may be followed by one or more dropout layers configured to prevent overfitting, and one or more normalization layers to stabilize the learning process described herein.

With continued reference to FIG. 1, in an embodiment, training the feature extraction algorithm 140 (i.e., CNN) may include selecting a suitable loss function to guide the training process. In a non-limiting example, a loss function that measures the difference between the predicted out and the ground truth. Features may be used, such as, without limitation, mean squared error (MSE) or a custom loss function may be designed for one or more embodiments described herein. Additionally, or alternatively, optimization algorithms, such as stochastic gradient descent (SGD), may then be used to adjust the feature extraction algorithm 140's parameters to minimize such loss. Additionally, CNN may be extended with additional deep learning techniques, such as recurrent neural networks (RNNs) or attention mechanism, to capture additional features and/or data relationships within input data. These extensions may further enhance the accuracy and robustness of the extracting a plurality of features 136 from the plurality of serial slide section images 124 using feature extraction algorithm 140.

With continued reference to FIG. 1, in some embodiments, feature extraction algorithm 140 may include feature learning algorithms. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithm may detect co-occurrences of elements, as defined above, with each other. Computing device may perform a feature learning algorithm by dividing elements or sets of data into various sub-combinations of such data to create new elements of data, and evaluate which elements of data tend to co-occur with which other elements. In an embodiment, first feature learning algorithm may perform clustering of data.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\arg\min_{c_i \in C} dist(c_i, x)^2$, where argmin includes argument of the minimum, $c_i$ includes a collection of centroids in a set C, and dist includes standard Euclidean distance. K-means clustering module may then recompute centroids by taking mean of all cluster data entries assigned to a centroid's cluster. This may be calculated based on $c_i = 1/|S_i| \Sigma x_i \in S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, memory 132 may include instructions configuring the at least a processor 128 to register the plurality of serial slide section images 124 as a function of the plurality of features 136.

In some embodiments, at least a processor 128 is configured to register at least a portion of a second image of plurality of slide images 120 to at least a portion of first image of the plurality of slide images 120 at first magnification level to derive a transformation matrix. As used in this disclosure, a "transformation matrix" is a mathematical construct used to perform geometric transformations on a given image. Exemplary geometric transformations may include, without limitation, translation, rotation, scaling, shearing, and the like. In some embodiments, during image registration, transformation matrix may be used to define, for instance, and without limitation, how one image e.g., at least a portion of second image needs to be adjusted, to align with another image e.g., at least a portion of first image. Exemplary embodiments of transformation matrix are described in further detail below.

With continued reference to FIG. 1, in one or more embodiments, transformation matrix may include a plurality of transformation parameters to align at least a portion of second image to at least a portion of first image at first magnification level. "Transformation parameters," as described herein, are values used in transformation matrix to perform geometric adjustments on an image. In an embodiments, transformation parameters may include translation parameters used to shift image along a give x and y axes. In another embodiment, transformation parameters may include a rotation parameter configured to rotate image around a specific point at a specific angle of rotation. In yet another embodiment, transformation parameters may include a scaling parameter used to adjust the size of the image. In some cases, scaling may be uniform (e.g., same factor for both aces) or, in other cases, non-uniform (e.g., different factors for the x and y axes). In yet another embodiment, transformation parameters may include a shearing parameter configured to distort image by, for instance, slanting it along the x or y axis. As a person skilled in the art, upon reviewing the entirety of this disclosure, will be aware of various transformation parameters incorporated within transformation matrix.

With continued reference to FIG. 1, as a non-limiting example, a portion of candidate slide may be registered to a portion of reference slide to calculate, by at least a processor 128, a transformation matrix. Both candidate slide and reference slide may be at a baseline magnification level, for example, first magnification level which is lower than the target magnification level. In some embodiments, first magnification level may be a default magnification level of the digital slide (e.g., WSI). For example, and without limitation, the baseline magnification level may be 0.3×.

With continued reference to FIG. 1, registering a portion of second image to a portion of first image at first magnification level may be done using machine vision model as described below. In some cases, it may be easier for computer vision model to register portions of two slides at a low magnification level (e.g., 0.3×), than to register them at a high magnification level (e.g., 10×). For example, and without limitation, it may be hard for computer vision model to register a portion of the candidate slide to a portion of the reference slide at target magnification level in one shot, while it is relatively easy for the computer vision model to register two slides at a magnification level lower than the target magnification level (e.g., the first magnification level). However, it should be noted that transformation matrix derived by registering two slides at the lower magnification level may still be helpful to register these two slides at the high magnification level, the details of which is to be described below.

With continued reference to FIG. 1, in some embodiments, the registration may be rigid. In some embodiments, registration may include a registration algorithm 144 consistent with a registration algorithm discussed throughout this disclosure. A "registration algorithm," for the purposes of this disclosure, is a mathematical process for mapping multiple images into a common coordinate system. For example, rigid registration may include affine transformation involving identification of key points (e.g., the points with gradients in two orthogonal directions) and descriptors (e.g., feature vector invariant to translation, rotation, and scale) on first region of interest on first image of the reference slide and corresponding second ROI on the second image of the candidate slide. Then the affine transformation may identify the correspondences by matching key points across two slides using distance between descriptors. Finally, affine transformation may perform in-plane rotation, scale, skew, and translation to derive transformation matrix. For example, and without limitation, transformation matrix may include a 2×3 matrix representing 6 degrees of freedom (DoF). For the purposes of this disclosure, an "affine transformation" is a linear mapping method that preserves points, straight lines, and planes.

With continued reference to FIG. 1, as a non-limiting example, using the matched portions of the slides, at least a processor 128 may calculate one or more aforementioned transformation parameters. For instance, at least a processor 128 may determine that candidate slide needs to be shifted 10 units right and 5 units up (translation), rotated by 15 degrees (rotation), and scaled by 1.1 in both direction (scaling). At least a processor 128 may then construct, as a function of the determined transformation parameters, below transformation matrix:

$$T = \begin{bmatrix} \cos(\theta) & -\sin(\theta) & tx \\ \sine(\theta) & \cos(\theta & ty \\ 0 & 0 & 1 \end{bmatrix}$$

Wherein tx=10, ty=5, and θ=15°. People skilled in the art will appreciate that some or all information in the transformation matrix derived from registering two slides at a low magnification level (e.g., the first magnification level) may be used to register the same two slides at higher magnification levels (e.g., target magnification level). For example, the in-plane rotation degree at the first magnification level should be similar to or even same as that at the target magnification level.

With continued reference to FIG. 1, the at least a structure may include an organ. As used in this disclosure, an "organ" is an anatomical structure within a subject. In an embodiment, the organ may perform one or more specific physiological functions and may be composed of multiple tissue types working in coordination. For example, without limitation, the organ may be the liver, which is responsible for metabolic processing, detoxification, and bile production. In another example, an organ may be the lung, which facilitates gas exchange through its alveolar structures. Continuing, the organs may vary in complexity and may be part of a larger system, such as the cardiovascular, digestive, or endocrine systems, each contributing to the overall function and homeostasis of the organism. In an embodiment, the organ may include a cell and/or just a portion of tissue.

Still referring to FIG. 1, in some embodiments, apparatus 100 may include a machine vision system that includes at least a slide scanner 108. A machine vision system may use images from at least a slide scanner 108, to make a determination about a scene, space, and/or object. For example, in some cases a machine vision system may be used for registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, in some embodiments, registration may account for tissue deformation. For example, tissue deformation may include changes in the tissue through thickness of the tissue block. In some embodiments, accounting for tissue deformation may include accounting for structural continuations between slide images 120. In some embodiments, CNN, as described above, may be used for this purpose, leveraging its capability to extract and compare complex image features 136 such as tissue patterns, cellular structures, morphological contours, and the like. Without limitation, the convolutional neural network may be configured to scan each of the slide images 120 to detect spatially coherent and visually distinctive features 136 that are shared across the dataset. The convolutional neural network may apply learned filters at multiple levels of abstraction to identify candidate regions representing the at least a structural continuation, a specific anatomical landmark, staining artifact, or structural boundary, appearing across the different image sources. In another non-limiting example, once the at least a structural continuation has been identified in the plurality of slide images 120, the convolutional neural network may be employed to compute the transformations needed to align these points with respect to each other. This alignment may include translations, rotations, scaling operations, and the like that bring the corresponding features into geometric concordance. The result may include a more precisely refined 3D stack view in which shared features 136 across input images are registered into a unified visual framework. In some embodiments, in order to account for changes in the tissue through the thickness of the tissue block.

With continued reference to FIG. 1, in some embodiments, registering plurality of serial slide section images 124 as a function of plurality of features 136 may include identifying a common feature between a portion of plurality of features 136. For the purposes of this disclosure, a "common feature" is a feature that appears in more than one image. For example, in some embodiments, processor 128 may compare plurality of features 136 against one another to find a common features. In some embodiments, common features may include, as non-limiting example, tissue boundaries, cell boundaries, organ boundaries, shapes, stains, and the like.

With continued reference to FIG. 1, in some embodiments, registering plurality of serial slide section images 124 as a function of plurality of features 136 may include aligning the portion of plurality of serial slide section images plurality of serial slide section images 124 as a function of common feature. In some embodiments, this may include applying a transformation matrix to the portion of plurality of serial slide section images 124 as discussed in further detail above. In some embodiments, aligning the portion of plurality of serial slide section images plurality of serial slide section images 124 as a function of common feature may include determining a translational displacement between the common feature in a first slide compared to a second slide. This may include, as a non-limiting example, applying the translational displacement to the second slide such that the common features become co-located.

With continued reference to FIG. 1, processor 128 is configured to generate a three-dimensional (3D) stack view 148, wherein the 3D stack view 148 comprises plurality of serial slide section images 124. In some embodiments, 3D stack view 148 may include plurality of serial slide section images 124 aligned in a cascaded view, wherein plurality of serial slide section images 124 are displayed overlayed on one another. For the purposes of this disclosure, a "3D stack view" is a view of a plurality of slides, wherein the slides are at least partially overlayed on one another so as to render a three-dimensional view of the plurality of slides. In some embodiments, 3D stack view 148 may include plurality of serial slide section images 124 displayed on top of one another. In some embodiments, 3D stack view 148 may include plurality of serial slide section images 124 displayed on top of one another in a stack. In some embodiments, 3D stack view 148 may include one or more of plurality of serial slide section images 124 displayed using transparency, such that one or more elements of a slide image is at least partially transparent. 3D stack view 148 is described further with reference to FIGS. 2-4.

With continued reference to FIG. 1, generating 3D stack view 148 may include aligning common features as described above. In some embodiments generating 3D stack view may include applying one or more transformation matrices, as described above, to one or more slide images of plurality of serial slide section images 124 so as to align common features.

With continued reference to FIG. 1, generating 3D stack view 148 may include positioning, using one or more spatial transformations, plurality of serial slide section images 124 into 3D stack view 148 based on the at least a similarity of the one or more features 136 of the at least a structure. As used in this disclosure, a "spatial transformation" is an operation applied to image data to change a spatial component. In an embodiment, the spatial component may include the position, orientation, scale, or geometry of the image. Without limitation, the spatial transformation may include affine transformations, perspective transformations, non-linear warping, and/or other types of geometric modifications used to align images based on shared features 136 or reference points.

With continued reference to FIG. 1, in some embodiments, generating a 3D stack view 148 using plurality of serial slide section images 124 may include using a transformation model. In some embodiments, a transformation model may define how one image is spatially manipulated to align with another, which can be particularly useful in histopathology when a large tissue sample, such as a tumor, is sectioned into smaller fragments and mounted on multiple slides. In this context, a rigid or affine transformation might be employed to account for translational or rotational misalignments that occur during slide preparation. If the tissue has been distorted due to slicing or mounting processes, a deformable transformation model, possibly using B-splines or fluid-based warping, may allow for localized alignment of tissue fragments. Once a transformation model is chosen, a similarity cost function may be used to evaluate how well a transformed tissue section aligns with adjacent sections. In histopathology, since images typically come from the same staining and imaging modality such as, H&E staining, sum of squared differences (SSD) or normalized cross-correlation (NCC) might be appropriate. Continuing, these metrics may help determine the degree of alignment based on pixel intensity values and spatial features across neighboring slides. If sections are stained differently, mutual information (MI) could serve as a more robust metric, capturing statistical dependencies between intensity distributions. An optimization method may iteratively refine the transformation parameters to improve alignment accuracy. This process might start with an initial estimate, such as an approximate overlay of two tissue sections, and proceed through successive iterations where alignment is measured, parameters adjusted, and alignment re-evaluated. For example, without limitation, this may support automated digital reconstruction of a full tumor specimen from multiple slices. For instance, without limitation, given five sequential slides of a tumor, an algorithm might apply affine transformations to coarsely align them, use NCC to evaluate the overlap between features 136 like nuclei and glandular structures, and iteratively adjust the positioning until 3D stack view 148 achieves optimal alignment. Without limitation, this process may reduce the cognitive burden on pathologists, standardize tissue reconstruction, and facilitate downstream digital analysis.

With continued reference to FIG. 1, generating 3D stack view 148 may include generating an interpolated layer 149 from a first slide of plurality of slide images 120 and a second slide of plurality of slide images 120. For the purposes of this disclosure, "interpolated layer" is an estimated slide section that is determined from at least two slides of a plurality of serial slide section images. Generating interpolated layer 149 may include generating interpolated layer 149 using an interpolation algorithm 150. An "interpolation algorithm," for the purposes of this disclosure, is a mathematical process by which an interpolated layer is generated.

With continued reference to FIG. 1, interpolation algorithm 150 may include intensity-based morphing. In some embodiments, interpolation algorithm 150 may include morphological median operations. Unlike conventional interpolation methods such as bilinear or bicubic techniques that rely on pixel-level averaging, morphological interpolation focuses on preserving the structural and geometric features of an image. The key idea is to find a "median" image that semantically represents a midpoint between two images by using morphological tools like dilation and erosion, resulting in an output that retains meaningful shapes and edges. This method may be particularly effective in image morphing and temporal interpolation tasks-such as generating intermediate video frames or filling gaps between 3D medical imaging slices. By applying morphological operations to pairs of images, the algorithm creates intermediate frames that maintain object boundaries and structural consistency, avoiding the blurring or ghosting artifacts often introduced by traditional interpolation. In some embodiments, interpolation algorithm 150 may include diffeomorphic warping.

With continued reference to FIG. 1, interpolation algorithm 150 may include deep learning-based image synthesis. In some embodiments, this may include the use of a DNN as further described in this disclosure. In some embodiments, DNN may be trained to generate interpolated layer 148 in a recursive manner by gradually reducing the residuals of the previous network. In some embodiments, DNN may be trained on training data comprising historical slide images or serial slide images. In some embodiments, interpolation algorithm 149 may include a generative adversarial network (GAN). The GAN may be configured to generate pseudo slide images using a generator model. The generator model may be trained on training data comprising historical slide images. The generator model output may be fed into a classifier model. The classifier model may be configured to classify the generated image as real or fake (e.g., 1 or 0). This classification may be fed back to generator model as feedback in order to tune the generator model to create images that will fool the classifier. In this manner, the generator model is trained to generate images where the classifier is unable to distinguish whether they are real or fake. In some embodiments, GAN may be fed a first image and a second image and may output a pseudo interpolated image.

With continued reference to FIG. 1, in some embodiments, processor 128 may be configured to identify as a function of plurality of features 136, a set of points 152 associated with a tissue object 156. For the purposes of this disclosure, a "tissue object" is an element that is made of human or animal tissue. In some embodiments, tissue object 156 may include a tumor 160. In some embodiments tissue object 156 may include an organ 164. In some embodiments, tissue object 156 may include a muscle. In some embodiments, tissue object 156 may include a ligament. In some embodiments, tissue object 156 may include skin. In some embodiment tissue object 156 may include the epidermal layer.

With continued reference to FIG. 1, in some embodiments, identifying a set of points 152 associated with a tissue object 156 may include using a feature classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, feature classifier may be trained using supervised training. For the purposes of this disclosure, "supervised learning" is a type of machine learning where a model is trained using a labeled dataset. In some embodiments, feature classifier may be trained using a classifier training dataset. In some embodiments, classifier training dataset may include a plurality of features labeled with an associated tissue object. For example, a feature located on a tumor, may be labeled with "tumor" or a specific type of tumor. In some embodiments, classifier training datasets may include a plurality of slide images that are annotated with tissue object labels. In these embodiments, features identified within those annotated portions, or points extracted within those annotated portions, may be labeled with the corresponding tissue type according to the annotation.

With continued reference to FIG. 1, in some embodiments, feature classifier may be used to assign a tissue type to each feature of plurality of features 136. In some embodiments, feature classifier may be used to assign a tissue type to a subset of features of plurality of features 136. For example, each feature of plurality of features 136 (or a subset of features of plurality of features 136) may be fed as input into feature classifier. Feature classifier may then classify each feature that is received as input to a corresponding tissue type.

With continued reference to FIG. 1, identifying a set of points 152 associated with a tissue object 156 may include selecting the points 152 and/or or features 136 that are labeled with the selected tissue object 156. For example, if tissue object 156 is tumor 160, set of points 152 may include all features 136 labeled as a tumor, or a specific type of tumor. For example, if tissue object 156 is organ 164, set of points 152 may include all features 136 labeled as that organ, or a specific type of organ.

With continued reference to FIG. 1, in some embodiments, processor 128 may be configured to calculate a tissue volume 168 as a function of set of points 152 associated with tissue object 156. For the purposes of this disclosure, a "tissue volume" is a volume of a tissue object that is calculated from the presence of tissue object on a plurality of slides. In some embodiments, tissue volume 168 may include a tumor volume 172. In some embodiments, tissue volume 168 may include an organ volume 176. In some embodiments, tissue volume 168 may include a muscle volume. In some embodiments, tissue volume 176 may include a ligament volume.

With continued reference to FIG. 1, in some embodiments, calculating tissue volume 168 may include using numerical integration to calculate tissue volume 168. For the purposes of this disclosure, "numerical integration" is a method used to approximate the value of an integral using numerical methods rather than mathematically evaluating the integral. Numerical integration algorithms may include, without limitation, trapezoidal integration methods, which approximate the area under the curve by connecting adjacent data points with linear segments; Simpson's rule, which applies quadratic polynomial interpolation between data points to improve the accuracy of area estimation over smooth regions; or more sophisticated adaptive quadrature methods, which dynamically adjust the size and placement of integration intervals based on the local complexity of the signal, thereby achieving higher precision for signals exhibiting rapid changes, oscillatory behavior, or nonuniform sampling rates. In some embodiments, the choice of numerical integration method may be user-configurable or may be automatically selected by computing device 104 based on characteristics, such as smoothness, noise level, or required computational efficiency. In some embodiments, numerical integration may include Monte Carlo integration. Monte Carlo integration may use random sampling and can be particularly useful when dealing with high-dimensional integrals. In some embodiments, numerical integration may include gaussian quadrature. Gaussian quadrature may use specifically chosen points and weights in order to achieve higher accuracy. In some embodiments, calculating tissue volume 168 may include identifying a tissue volume 168, In some embodiments, calculating tissue volume 168 may include identifying a boundary of tissue volume 168. In some embodiments, this may include using edge detections to identify boundary of tissue volume 168 as discussed in further detail above. In some embodiments, tissue volume 168 may be calculated by integrating between the boundaries of tissue volume 168. In some embodiments, each plurality of serial slide section images 124 may include a thickness value between a first image 120 and a second image 120. This thickness value may represent the displacement between first image 120 and second image 120 in the tissue block. This thickness value may be used in order to preform the numerical integration in order to calculate the tissue volume 168. For example, a numerical integral may be calculated by calculating the area within a set of tissue boundaries within on of plurality of serial slide section images 124. This area value may be multiplied by the thickness value in order to approximate the volume. This may be repeated for the other slides in plurality of serial slide section images 124. A person of ordinary skill in the art, after having reviewed the entirety of this disclosure, would appreciate that a variety of numerical integration methods may be applicable to calculate tissue volume 168.

With continued reference to FIG. 1, the automated calculation of tissue volume 168 is an improvement as it allows for the quick calculation of a tumor volume/organ volume from plurality of serial slide section images 124. This reduces the need for the time consuming process of manually calculating the tumor volume/tissue volume. The unique application of the feature extraction allows for the calculation of tumor volume/organ volume using numerical integration techniques.

With continued reference to FIG. 1, in 3D stack view may include an organ-specific alignment. An "organ-specific alignment," for the purposes of this disclosure, is a specific order of plurality of serial slide section images 124 that is informed by the presence of an organ in plurality of serial slide section images 124. For example, one or more of plurality of serial slide section images 124 are detected to contain skin, then the plurality of serial slide section images 124 may be automatically resorted such that the images including skin appear on the top of 3D stack view. In some embodiments, the presence of skin may be determined using feature classifier as disclosed in further detail above.

With continued reference to FIG. 1, in some embodiments, processor 128 may be configured to assess tumor progression and invasion. In some embodiments, processor 128 may be configured to calculate a first tumor volume 172 in a first slide and compare it to a second tumor volume 172 in a second slide. The difference or percentage change between first tumor volume 172 and second tumor volume 172 may quantify tumor progression and/or invasion. In some embodiments, tumor volume 172 may be compared against a tumor volume 172 calculated using a historical set of slide images 120. This may include calculating a difference or percentage change between the tumor volumes 172. This may be used to quantify the changes in a tumor between slide images 120 taken at a first point in time and slide images 120 taken at a second point in time.

With continued reference to FIG. 1, in some embodiments, processor 128 may be configured to assess changes in organ volume 176. In some embodiments, processor 128 may be configured to calculate a first organ volume 176 in a first slide and compare it to a second organ volume 176 in a second slide. The difference or percentage change between first organ volume 176 and second organ volume 176 may quantify organ changes. In some embodiments, organ volume 176 may be compared against a organ volume 176 calculated using a historical set of slide images 120. This may include calculating a difference or percentage change between the organ volumes 176. This may be used to quantify the changes in an organ between slide images 120 taken at a first point in time and slide images 120 taken at a second point in time.

With continued reference to FIG. 1, processor 128 is configured to display 3D stack view 148 through a display device 180. A "display device," for the purposes of this disclosure, is an electronic device configured to present visual information to a user or users for their viewing. As non-limiting examples, display device 180 may include a monitor, a TV, a screen, a phone, a watch, and the like. In some embodiments, display device 180 may include a display, such as, but not limited to, OLED, LED, CRT, plasma, LCD, AMOLED, QLED, and the like. In some embodiments, display device 180 may include a mobile device. A "mobile device," for the purposes of this disclosure, is a device, including a display device, that is capable of being transported easily by a single user. Mobile device may include, as non-limiting examples, a smartphone, a smartwatch, a tablet, a laptop, and the like.

With continued reference to FIG. 1, display device 180 may be wirelessly connected to processor 128. This may include any wireless connection disclosed in this disclosure. In some embodiments, display device 180 may have a wired connection with processor 128. This may include any wired connection disclosed throughout this disclosure.

With continued reference to FIG. 1, displaying 3D stack view 148 through display device 180 may include generating a graphical user interface. A "graphical user interface," for the purposes of this disclosure, is a visual display through which a user can interface with a computing system. Displaying 3D stack view 148 through display device 180 may include displaying graphical user interface using display device 180.

With continued reference to FIG. 1, displaying 3D stack view 148 through display device 180 may include generating a graphical user interface may include receiving a user input 184 through graphical user interface. For the purposes of this disclosure, a "user input" is an input received from a user by a computing system. Further disclosure related to graphical user interface and user input 184 is discussed with respect to FIGS. 3 and 4.

With continued reference to FIG. 1, displaying the 3D stack view 148 comprises displaying the 3D stack view 148 comprising the interpolated layer 149. In some embodiments, interpolated layer 149 may be displayed as an element of 3D stack view 148 between the two slide images 120 that interpolated layer 149 was generated from.

With continued reference to FIG. 1, displaying the 3D stack view 148 through display device 180 may include receiving a view angle input from the user. For example, view angle input may include a desired viewing angle. Desired viewing angle may include, as non-limiting examples, axial, sagittal, coronal, or the like. A "view angle input," for the purposes of this disclosure, is an input received from a user that instructs a system on a desired view angle or change in orientation for a displayed element. In some embodiments, view angle input may be received using a view angle display element. View angle display element may include, as non-limiting examples, buttons tied to a specific display angle, angles of rotation, or the like. In some embodiments, view angle input may be received through a mouse or touch input. For example, a user may click and drag using a mouse or using their finger (in a touch interface context) in order to rotate 3D stack view 148 to a desired position. In some embodiments, 3D stack view 148 may be updated to correspond to the view angle input. This may include rotating 3D stack view 148 to align with the desired view angle.

With continued reference to FIG. 1, the present disclosure improves over the state of the art as it allows for fully automated 3D reconstruction of histological slices. This allows for clinicians to quickly view and evaluate the changes of tissues throughout a tissue block aiding in their diagnosis and tracking of diseases.

Figure 2:
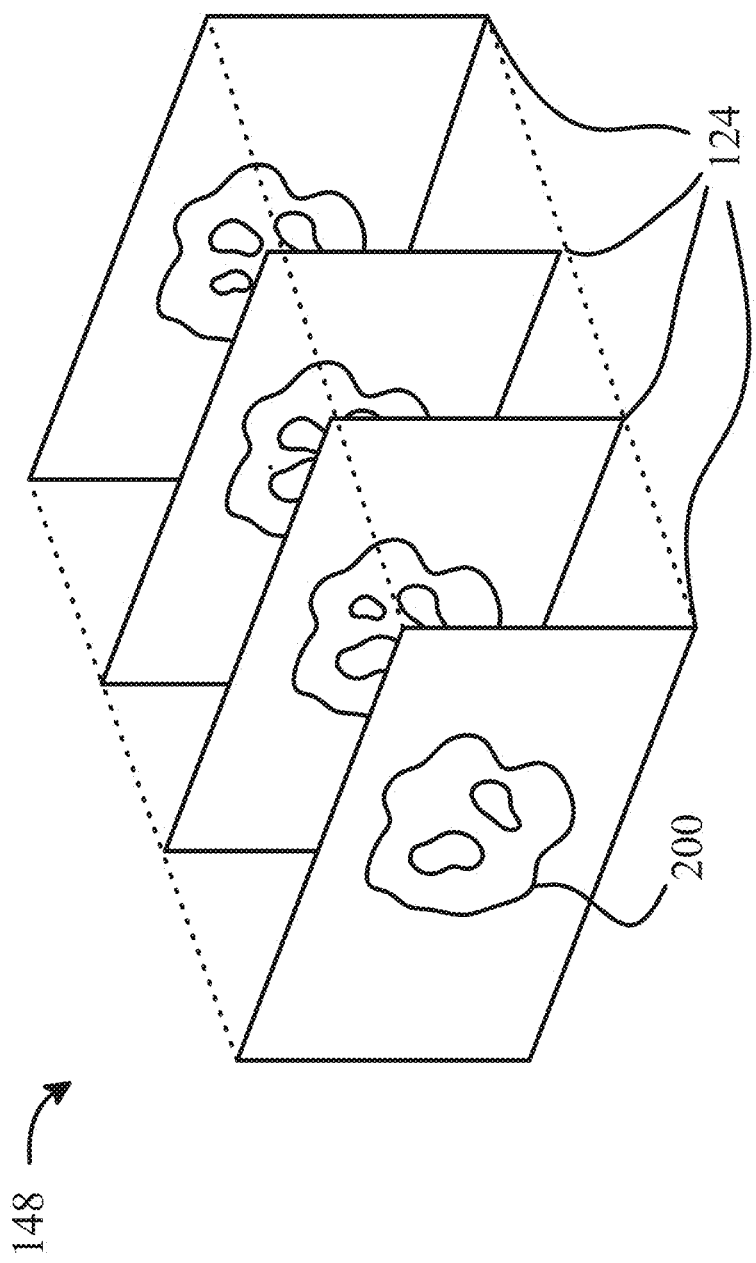
FIG. 2 is an illustration of an exemplary embodiment of a 3D stack view.

Referring now to FIG. 2, an illustration of 3D stack view 148 is shown. 3D stack view may include plurality of serial slide section images 124. In some embodiments, plurality of serial slide section images 124 may be assembled and displayed to a user in a stack. 3D stack view 148 may include a specimen 200. Specimen 200 may include any tissue object 156 discussed with reference to FIG. 1.

With continued reference to FIG. 2, 3D stack view 148 and the generation thereof represents an improvement over current practices as it allows for enhanced visualization tools for improved diagnostics. 3D stack view allows for clinicians to more easily visualize how tissue change throughout the tissue block. Additionally 3D stack view allows for visualization of tissue volumes and tumor volumes which allows for increased ability to track and diagnose diseases in patients. The methods disclosed herein for generation of 3D stack view also represent an improvement over current practices as the methods disclosed herein allow for automated generation of 3D stack view 148 with minimal or no clinician intervention.

Figure 3:
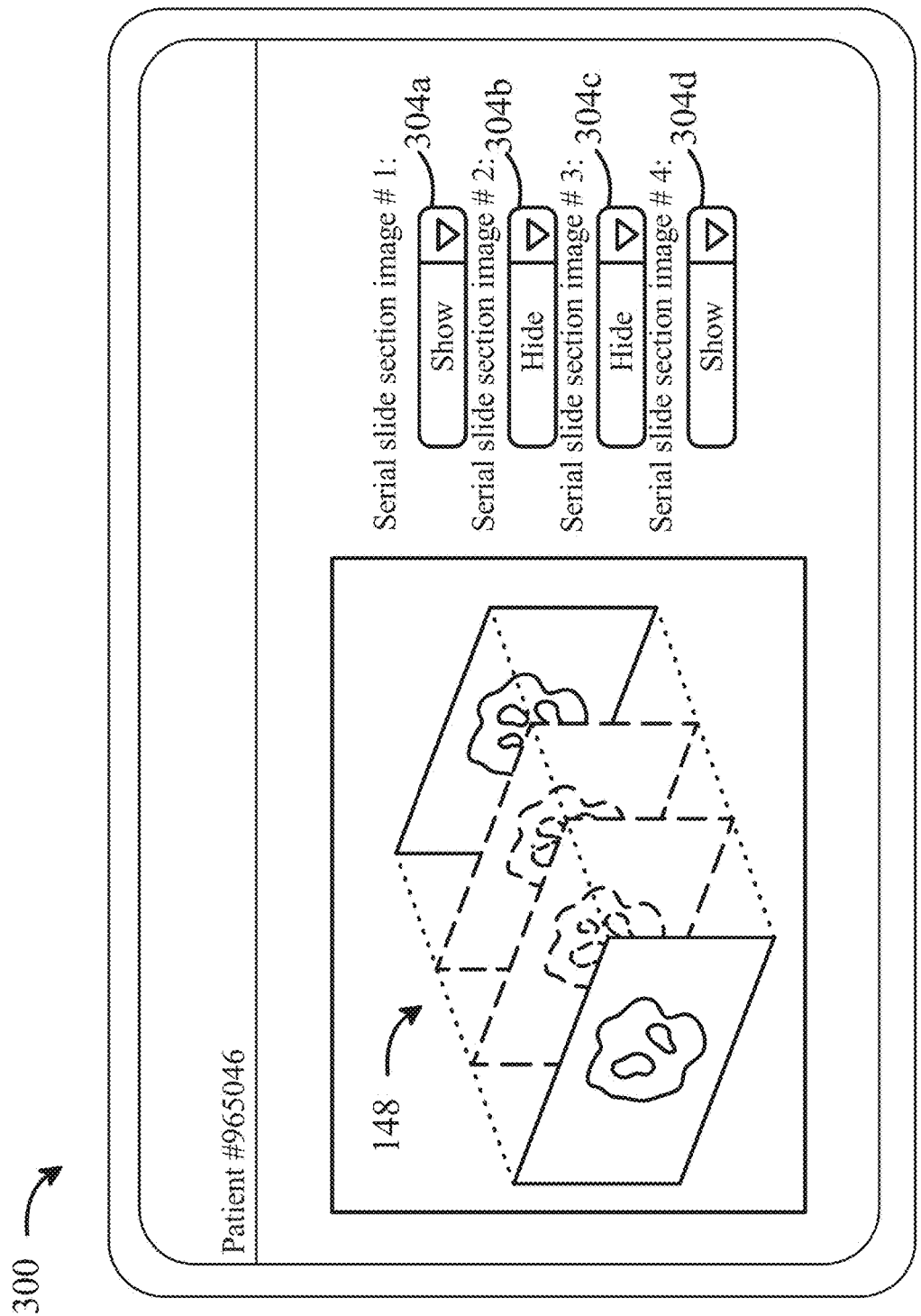
FIG. 3 is a diagram of an exemplary embodiment of a graphical user interface.

Referring now to FIG. 3, a graphical user interface 300 is shown. Graphical user interface 300 may be consistent with any graphical user interface disclosed with reference to FIG. 1. Graphical user interface 300 may include 3D stack view 148. In some embodiments, graphical user interface may include a slide section selection field 304a-d. A "slide section selection field," for the purposes of this disclosure, is a graphical user interface element that allows a user to input a user input for a specific slide image. Slide section selection field 304a-d may include, but is not limited to, a drop-down menu, a text entry box, a check box, a Y/N entry field, a button, and the like. In some embodiments slide section selection field 304a-d may include an event handler. An "event handler," for the purposes of this disclosure is a computer routine that is configured to perform an action in response to detecting an event. For example, event handler may be configured to perform an action in response to a user input.

With continued reference to FIG. 3, graphical user interface 300 may be configured to receive a user input through the slide section selection field 304a-d, wherein the user input selects subset of the plurality of serial slide section images. For example, slide section selection field 304a-d may include a drop-down menu allowing a user to select subset of the plurality of serial slide section images. In an embodiment, this may include a menu allowing a user to select to "show" or "hide" (or similar functionality) slide images from the plurality of serial slide section images. In some embodiments, graphical user interface 300 may be updated in response to receiving a selection of the subset of the plurality of serial slide section images. In some embodiments, this may include updating the 3D stack view 148 to display only the subset of the plurality of serial slide section images. In an embodiments, graphical user interface 300 may be updated to only display the images in the subset of the plurality of serial slide section images chosen by the user. For example, if a user selects to hide serial slide section images 2 and 3 while showing serial slide section images 1 and 4, images 2 and 3 may be hidden from view. As another example, if a user selects to hide serial slide section images 2 and 3 while showing serial slide section images 1 and 4, images 2 and 3 may be shown in see-through fashion. In some embodiments, a user may edit this functionality by inputting a desired opacity using graphical user interface 300. In some embodiments, even handler may be configured to watch for user input through slide section selection fields 304a-d and trigger graphical user interface 300 to update as a function of the input.

With continued refence to FIG. 3, graphical user interface 300 may allow for a user to customize or alter many visualization tools. For example user may be able to click on 3d stack view 148 in order to rotate it. This may include adjusting the viewing angle for 3d stack view 148. In some embodiments, graphical user interface 300 may allow for user to use a click and drag input to adjust the view of 3D stack view 148. In some embodiments graphical user interface 300 may include an input field wherein user may input a desired viewing angle for 3D stack view. In some embodiments, graphical user interface 300 may include an input field wherein user may input a tissue object to highlight. Graphical user interface 300 may be updated in response to highlight elements of 3D stack view 148 associated with the tissue object; for example, this can be done using the output of the feature classifier as disclosed above with reference to FIG. 1. "Highlighting," in this instance, may include any method of visually differentiating visual elements from surroundings, including, but not limited to, color highlighting, bolding, outlining, arrow indications, and the like. In some embodiments, color enhancements may be available through graphical user interface 300 which may be consistent with color enhancements disclosed in U.S. patent application Ser. No. 18/924,614, filed on Oct. 23, 2024, and entitled "SYSTEM AND METHODS FOR COLOR GAMUT NORMALIZATION FOR PATHOLOGY SLIDES," the entirety of which is incorporated herein by reference.

Figure 4:
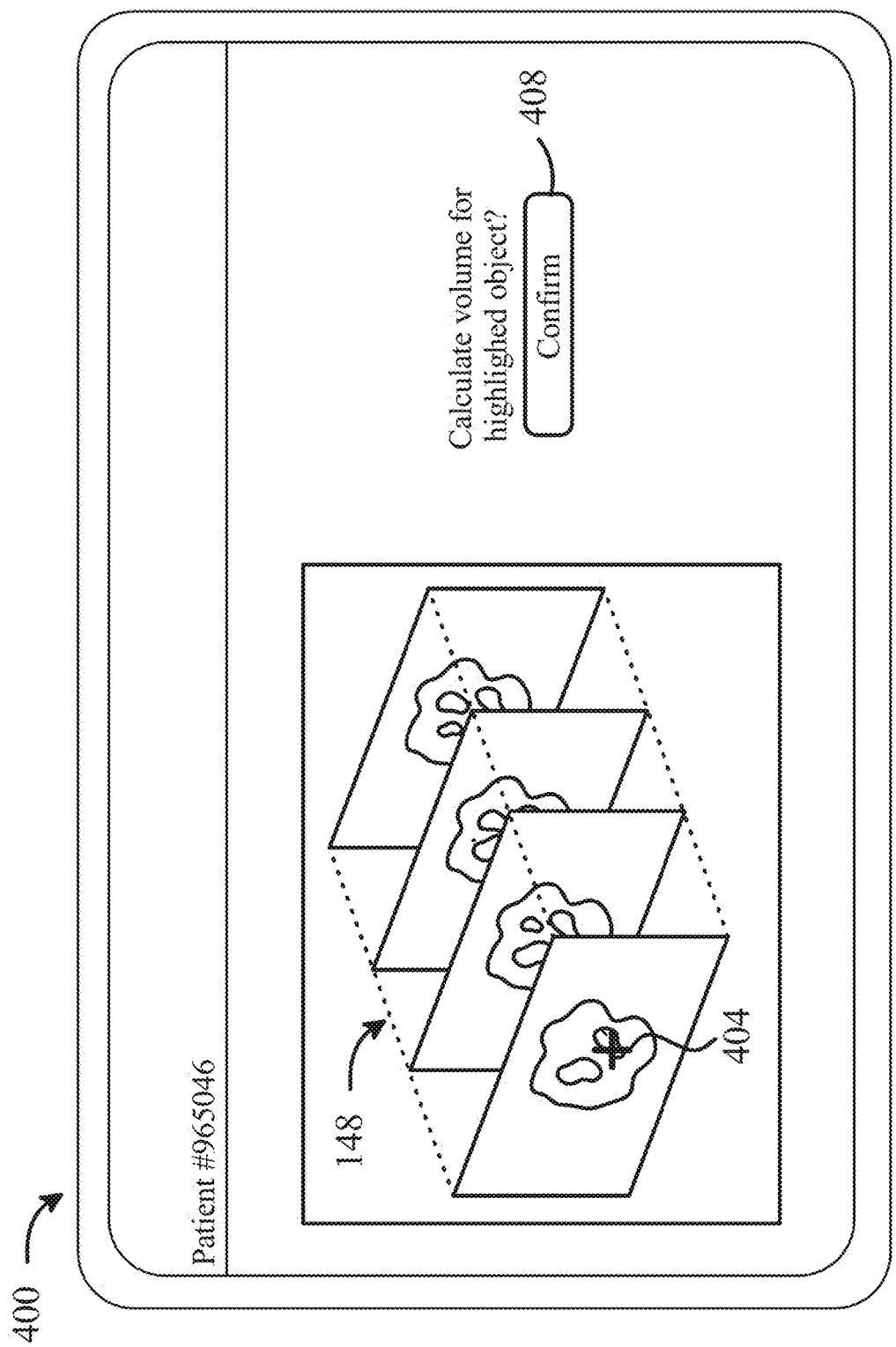
FIG. 4 a diagram of an exemplary embodiment of a graphical user interface.

Referring now to FIG. 4, a graphical user interface 400 is shown. Graphical user interface 300 may be consistent with any graphical user interface disclosed with reference to FIG. 1. Elements of graphical user interface 400 may be consistent with graphical user interface 300 disclosed with reference to FIG. 3. Graphical user interface 400 may include 3D stack view 148. Graphical user interface 400 may include a tissue object selection input mechanism 404. A "tissue object selection input mechanism," for the purposes of this disclosure, is an element of a user interface that allows for user selection of a tissue object of interest. In some embodiments, tissue object selection input mechanism 404 may include a cursor, which may allow a user to select a portion of 3D stack view 148 pertaining to the tissue object. In some embodiments, tissue object selection input mechanism 404, as non-limiting examples, may include a text entry field, drop down menu, check boxes, and the like. In some embodiments, graphical user interface 400 may be configured to allow for receiving a user input through tissue object selection input mechanism 404.

In some embodiments, a tissue volume may be calculate as a function of the user input; particularly user input received through tissue object selection input mechanism 404. For example, if a user clicks on a tumor within 3D stack view 148, a tumor volume for that tumor may be automatically calculated as disclosed further with reference to FIG. 1. For example, if a user clicks on an organ within 3D stack view 148, an organ volume for that organ may be automatically calculated as disclosed further with reference to FIG. 1. In some embodiments, the selected tissue object may be highlighted in 3D stack view 148. This may allow for a user to see what tissue object is selected. This can be used, in some embodiments, to allow for a user to confirm that their selection is correct, for example using a confirmation field 408.

Figure 5:
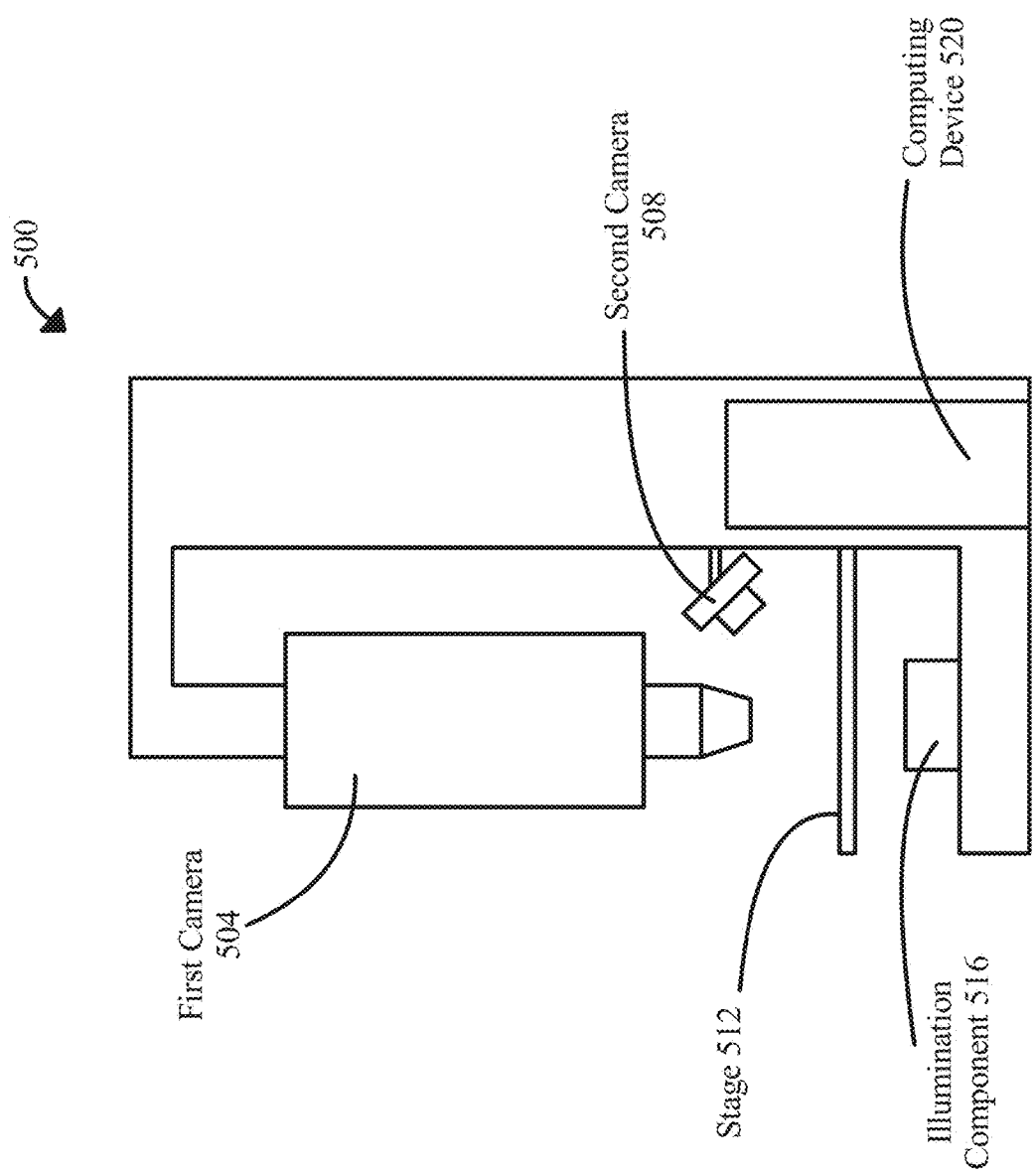
FIG. 5 is a diagram of an exemplary embodiment of a machine-learning module.

Referring now to FIG. 5, an exemplary embodiment of scanner 500 is depicted. Scanner 500 may include first camera 504. First camera 504 may include a camera configured to take high resolution, high magnification images. Scanner 500 may include second camera 508. Second camera 508 may include a camera configured to take wide field of view images, such as images covering the entirety of a slide. In some embodiments, images of plurality of images may be taken using first camera 504 and/or second camera 508. For example, first image may be taken using second camera 504 and second image may be taken using first camera 504. Scanner 500 may include stage 512. A slide may be placed upon stage 512. Stage 512 may include slide port. Scanner 500 may include illumination component 516. Illumination component 516 may provide lighting to a slide on stage 512. In some embodiments, illumination component 516 may be positioned such that a slide is backlit with respect to one or more cameras. Scanner 500 may include computing device 520. Computing device 520 may perform one or more functions described herein, such as selecting an algorithm, running an algorithm, and/or producing a control command.

Figure 6:
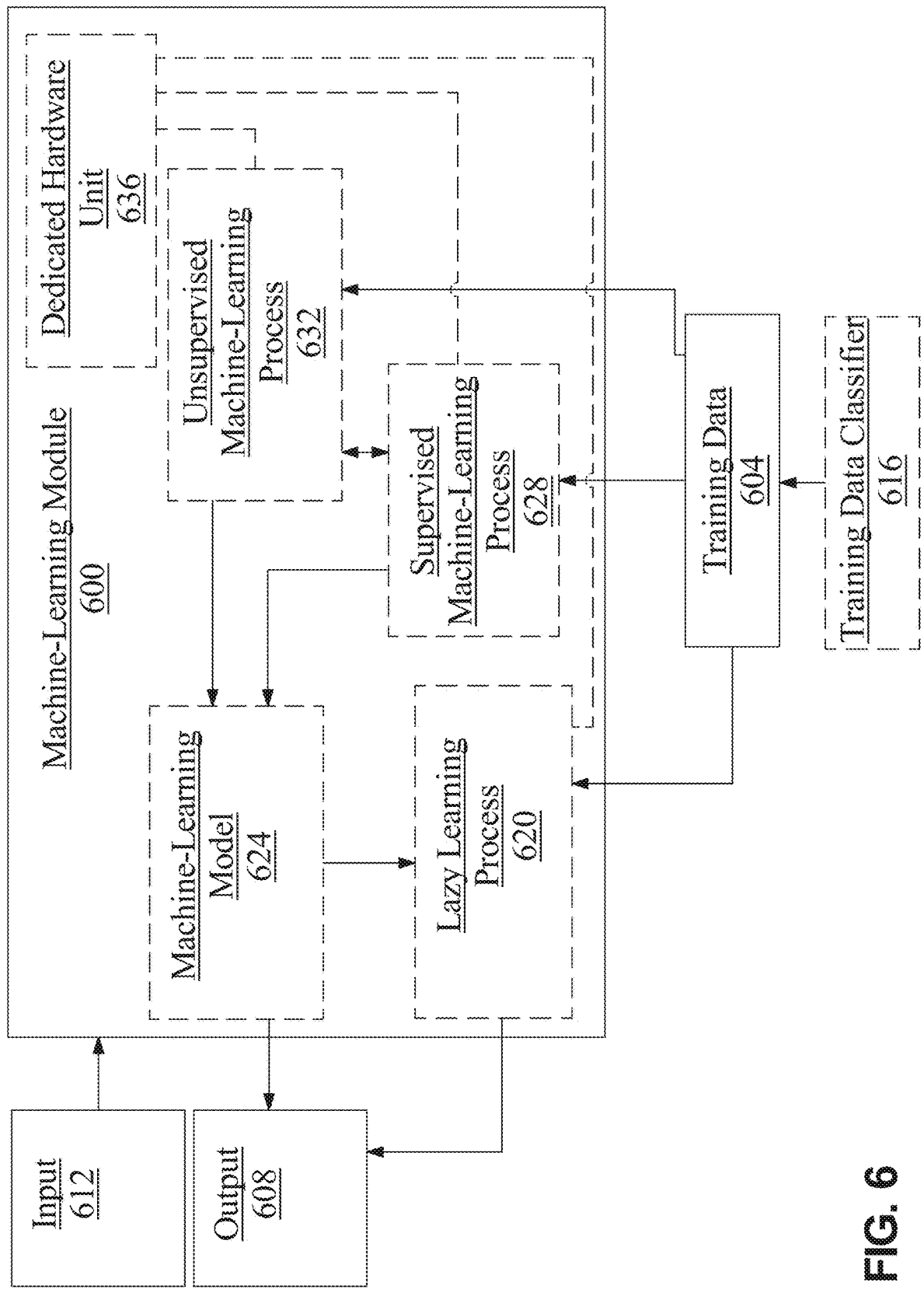
FIG. 6 is a diagram of an exemplary embodiment of a scanner.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example slides correlated to tissue objects.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to tissue types, disease types, and the like.

Still referring to FIG. 6, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 6, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 6, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 6, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max} : X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 6, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include slides as described above as inputs, features or tissue objects as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 6, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 6, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 632 may not require a response variable; unsupervised processes 632 may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 636. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 636 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 636 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 636 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
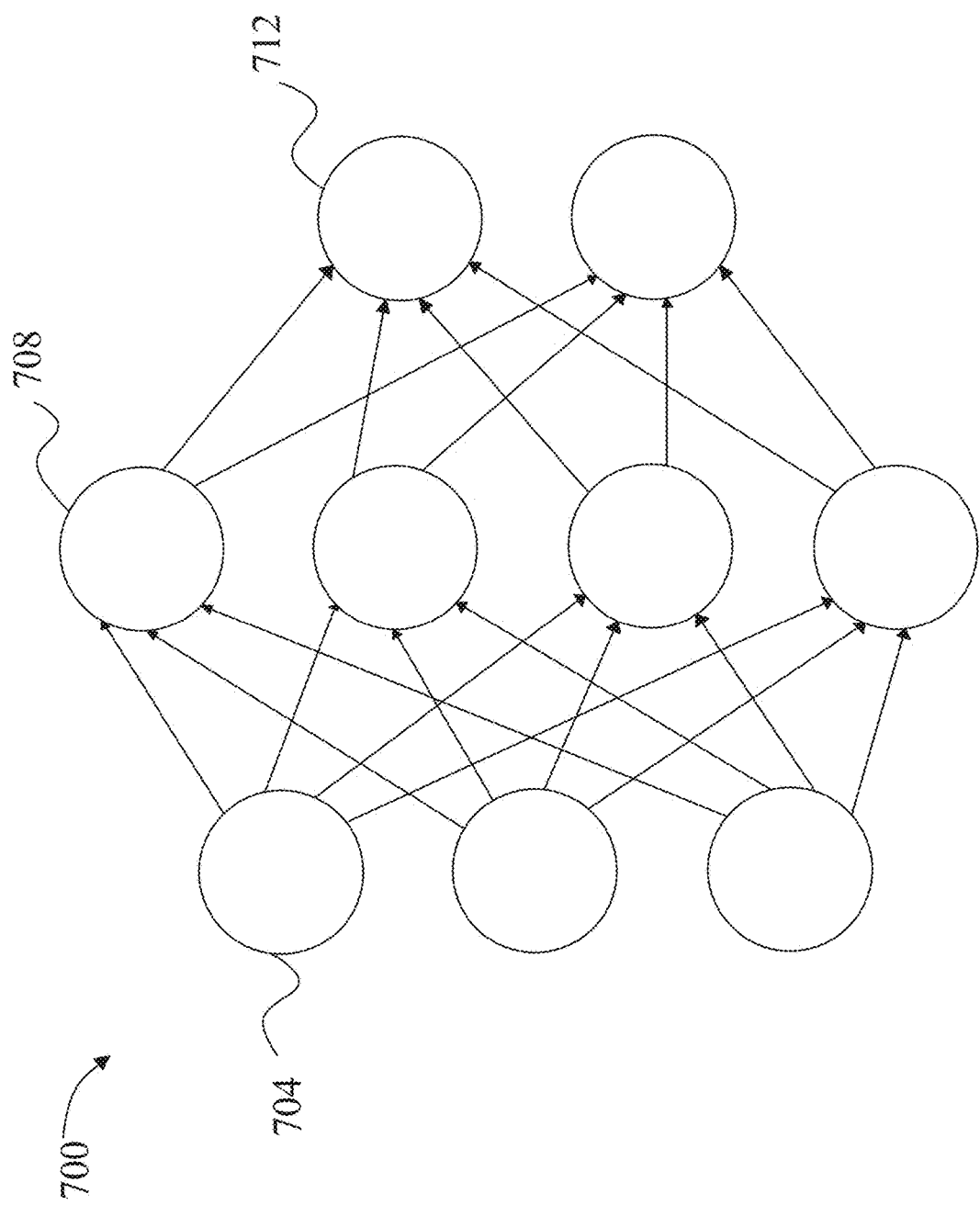
FIG. 7 is a diagram of an exemplary embodiment of a neural network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
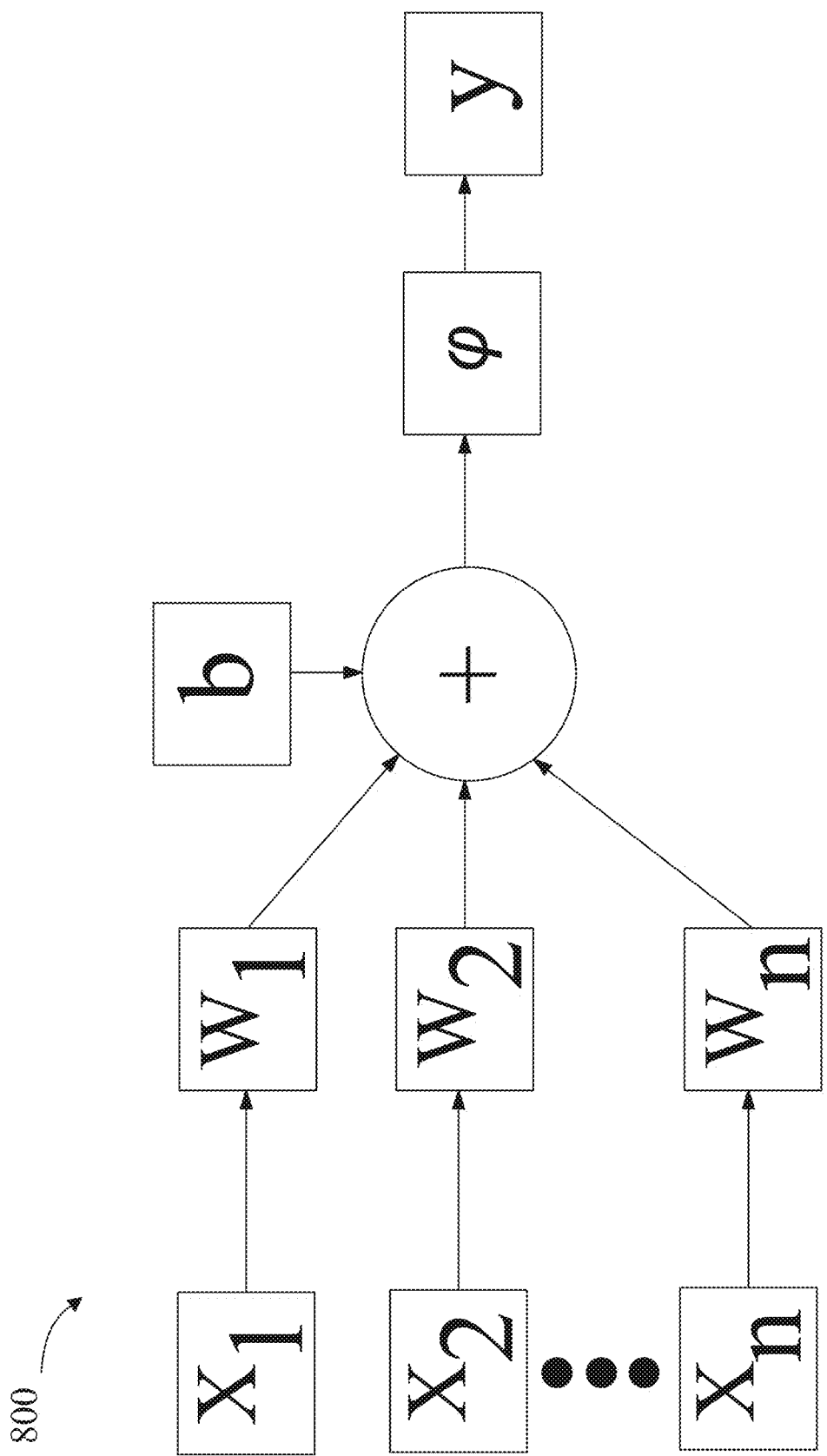
FIG. 8 is a diagram of an exemplary embodiment of a node of a neural network.

Referring now to FIG. 8, an exemplary embodiment of a node 800 of a neural network is illustrated. A node may include, without limitation a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x) = \tan h^2(x)$, a rectified linear unit function such as $f(x) = \max(0, x)$, a "leaky" and/or "parametric" rectified linear unit function such as $f(x) = \max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs xi that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 9:
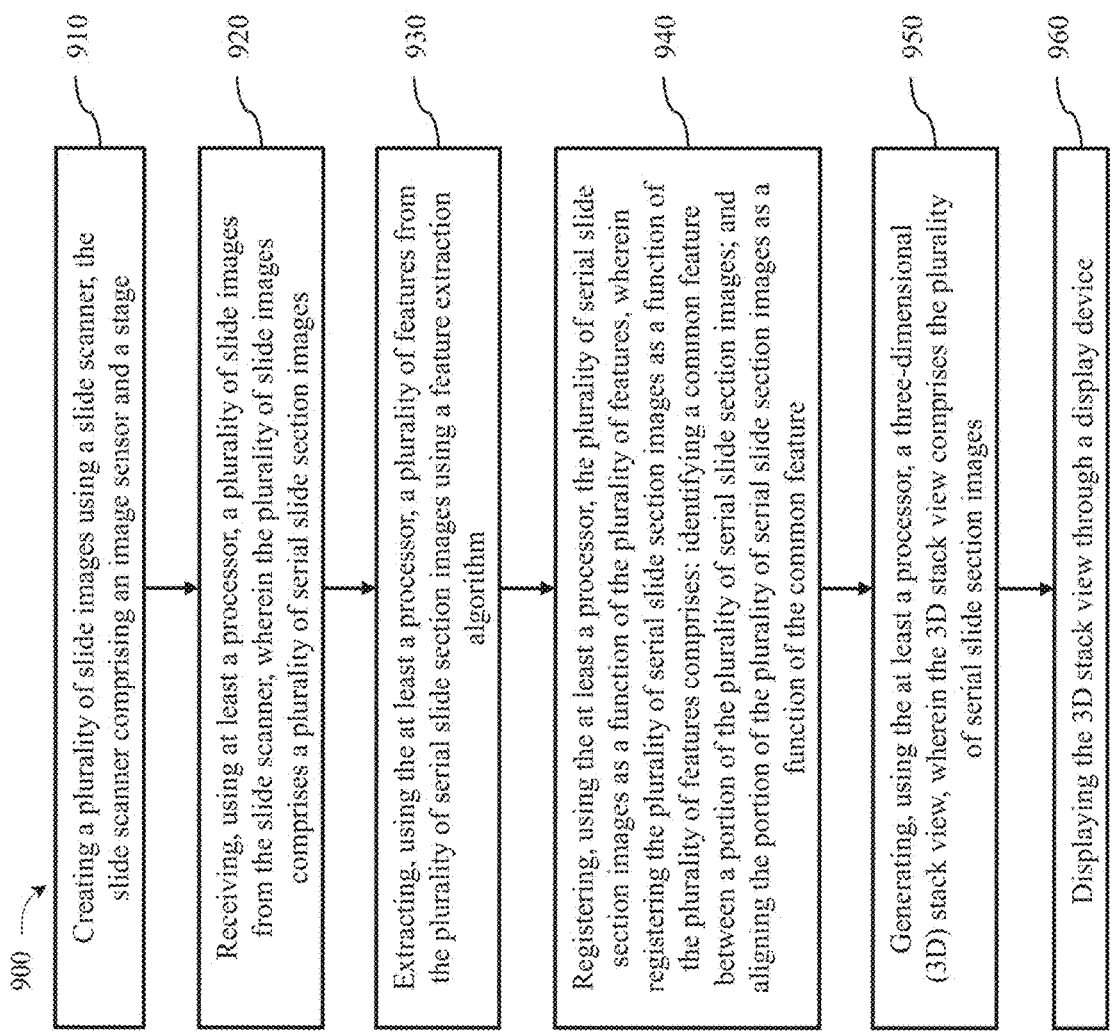
FIG. 9 is a flow diagram of an exemplary embodiment of a method for generating three-dimensional representations of serial sections.

Referring now to FIG. 9, an exemplary embodiment of a method 900 for generating three-dimensional representations of serial sections is shown. This may be conducted as disclosed with reference to FIGS. 1-8 above, without limitation.

At step 910, the method includes creating a plurality of slide images using a slide scanner, the slide scanner comprising an image sensor and a stage. This may be conducted as disclosed with reference to FIGS. 1-8 above, without limitation.

At step 920, the method includes receiving, using at least a processor, a plurality of slide images from the slide scanner, wherein the plurality of slide images comprises a plurality of serial slide section images. This may be conducted as disclosed with reference to FIGS. 1-8 above, without limitation.

At step 930, the method includes extracting, using the at least a processor, a plurality of features from the plurality of serial slide section images using a feature extraction algorithm. This may be conducted as disclosed with reference to FIGS. 1-8 above, without limitation.

At step 940, the method includes registering, using the at least a processor, the plurality of serial slide section images as a function of the plurality of features, wherein registering the plurality of serial slide section images as a function of the plurality of features comprises: identifying a common feature between a portion of the plurality of serial slide section images; and aligning the portion of the plurality of serial slide section images as a function of the common feature. This may be conducted as disclosed with reference to FIGS. 1-8 above, without limitation.

At step 950, the method includes generating, using the at least a processor, a three-dimensional (3D) stack view, wherein the 3D stack view comprises the plurality of serial slide section images. This may be conducted as disclosed with reference to FIGS. 1-8 above, without limitation.

At step 960, the method includes displaying the 3D stack view through a display device. This may be conducted as disclosed with reference to FIGS. 1-8 above, without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
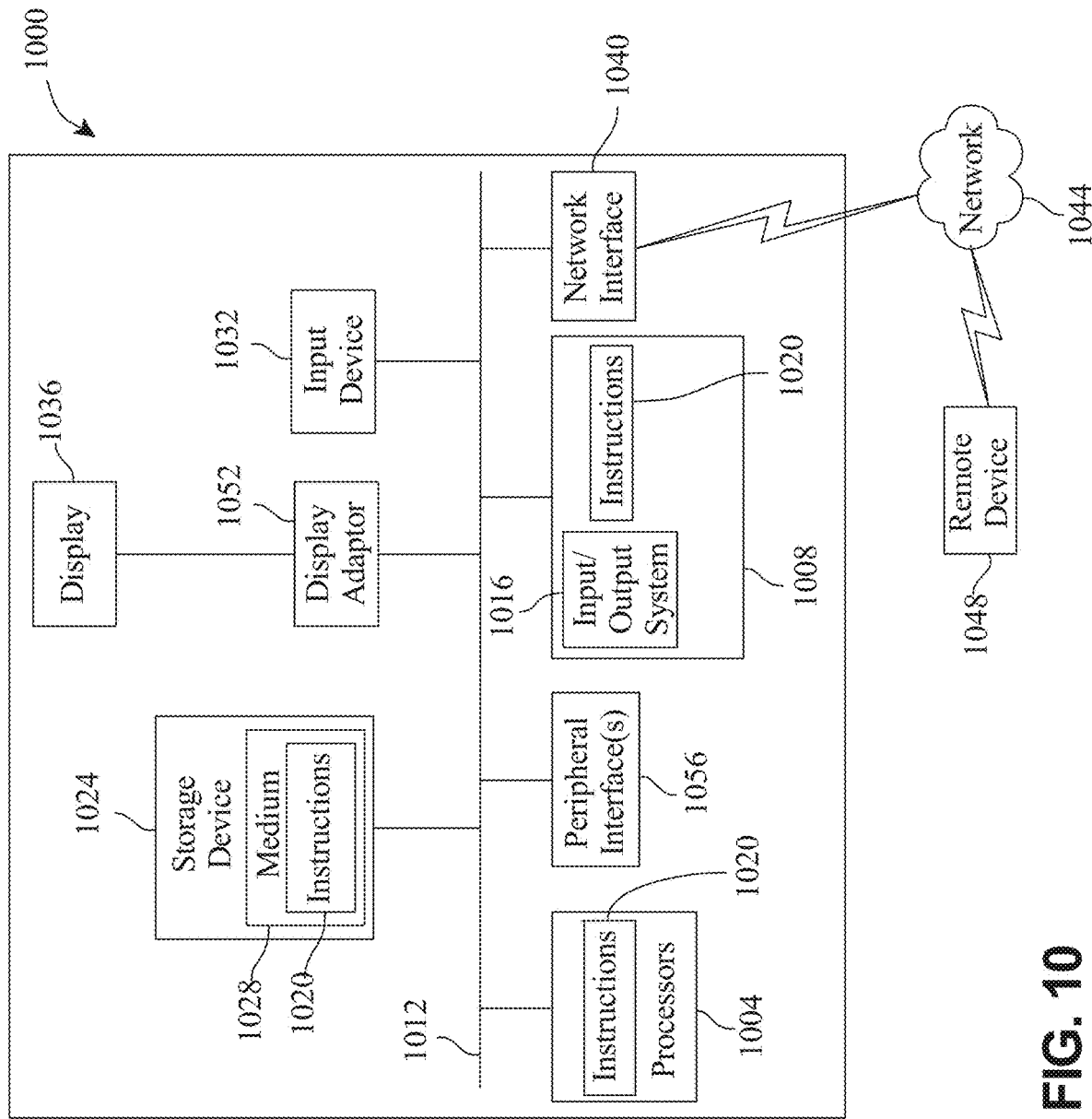
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof. Memory 1008 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown). Particularly, storage device 1024 and an associated machine-readable medium 1028 may provide nonvolatile and/or volatile storage of machine-readable instructions, data structures, program modules, and/or other data for computer system 1000. In some embodiments, storage device 1024 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display 1036. Examples of a display device include, but are not limited to, a liquid crystal display (LCD), a cathode ray tube (CRT), a plasma display, a light emitting diode (LED) display, and any combinations thereof. Display adapter 1052 and display 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

Further referring to FIG. 10, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 10, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 10, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 1000, processor 1004, and memory 1008 may be virtualized; that is, a virtual machine and/or container may interact directly with such computing system 1000, processor 1004, and/or memory 1008, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 1004 comprises a plurality of processors and/or processor cores, virtualization may, in some cases, simulate or emulate a single (virtual) processor whose functions are allocated to one or more of the plurality of processors and/or processor cores. In this case, while processor 1004 may be said to be virtualized, the processor 1004, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating three-dimensional representations of serial sections, wherein the apparatus comprises:
   a slide scanner, the slide scanner comprising an image sensor and a stage, wherein the slide scanner is configured to create a plurality of slide images;
   a memory; and
   at least a processor communicatively connected to the memory and the slide scanner, wherein the memory contains instructions configuring the at least a processor to:
   receive the plurality of slide images from the slide scanner, wherein the plurality of slide images comprises a plurality of serial slide section images;
   extract a plurality of features from the plurality of serial slide section images using a feature extraction algorithm;
   register the plurality of serial slide section images as a function of the plurality of features, wherein registering the plurality of serial slide section images as a function of the plurality of features comprises:
      identifying a common feature between a portion of the plurality of serial slide section images; and
      aligning the portion of the plurality of serial slide section images as a function of the common feature;
   generate a three-dimensional (3D) stack view, wherein the 3D stack view comprises the plurality of serial slide section images; and
   display the 3D stack view through a display device.

2. The apparatus of claim 1, wherein extracting the plurality of features from the plurality of serial slide section images using the feature extraction algorithm comprises extracting the plurality of features from the plurality of serial slide section images using a deep neural network (DNN).

3. The apparatus of claim 1, wherein the plurality of serial slide section images comprise a plurality of slide images of a single tissue block.

4. The apparatus of claim 1, wherein the memory contains instructions further configuring the at least a processor to determine a tissue volume wherein determining the tissue volume comprises:
   identifying, as a function of the plurality of features, a set of points associated with a tissue object; and
   calculating a tissue volume as a function of the set of points associated with the tissue object.

5. The apparatus of claim 4, wherein:
   the tissue volume comprises a tumor volume; and
   the tissue object comprises a tumor.

6. The apparatus of claim 4, wherein:
   the tissue volume comprises an organ volume; and
   the tissue object comprises an organ.

7. The apparatus of claim 1, wherein:
   generating the three-dimensional (3D) stack view comprises generating a graphical user interface, wherein the graphical user interface comprises:
      the 3D stack view; and
      a slide section selection field; and
   displaying the 3D stack view through the display device comprises displaying the graphical user interface.

8. The apparatus of claim 7, wherein displaying the 3D stack view through the display device further comprises:
   receiving a user input through the slide section selection field, wherein the user input selects subset of the plurality of serial slide section images; and
   updating the 3D stack view to display only the subset of the plurality of serial slide section images.

9. The apparatus of claim 1, wherein:
   generating the three-dimensional (3D) stack view comprises generating a graphical user interface, wherein the graphical user interface comprises:
      the 3D stack view; and
      a tissue object selection input mechanism; and
   displaying the 3D stack view through the display device comprises displaying the graphical user interface.

10. The apparatus of claim 9, wherein displaying the 3D stack view through the display device further comprises:
   receiving a user input through the tissue object selection input mechanism; and
   determining a tissue volume as a function of the user input.

11. The apparatus of claim 1, wherein:
generating the three-dimensional (3D) stack view comprises generating an interpolated layer from a first slide of the plurality of slide images and a second slide of the plurality of slide images; and
displaying the 3D stack view comprises displaying the 3D stack view comprising the interpolated layer.

12. The apparatus of claim 1, wherein displaying the 3D stack view through the display device comprises:
receiving a view angle input from the user; and
updating a display of the 3D stack view to correspond to the view angle input.

13. A method for generating three-dimensional representations of serial sections, wherein the method comprises:
creating a plurality of slide images using a slide scanner, the slide scanner comprising an image sensor and a stage;
receiving, using at least a processor, the plurality of slide images from the slide scanner, wherein the plurality of slide images comprises a plurality of serial slide section images;
extracting, using the at least a processor, a plurality of features from the plurality of serial slide section images using a feature extraction algorithm;
registering, using the at least a processor, the plurality of serial slide section images as a function of the plurality of features, wherein registering the plurality of serial slide section images as a function of the plurality of features comprises:
identifying a common feature between a portion of the plurality of serial slide section images; and
aligning the portion of the plurality of serial slide section images as a function of the common feature;
generating, using the at least a processor, a three-dimensional (3D) stack view, wherein the 3D stack view comprises the plurality of serial slide section images; and
displaying the 3D stack view through a display device.

14. The method of claim 13, wherein extracting the plurality of features from the plurality of serial slide section images using the feature extraction algorithm comprises extracting the plurality of features from the plurality of serial slide section images using a deep neural network (DNN).

15. The method of claim 13, wherein the plurality of serial slide section images comprise a plurality of slide images of a single tissue block.

16. The method of claim 13, further comprising determining, using the at least a processor, a tissue volume wherein determining the tissue volume comprises:
identifying, as a function of the plurality of features, a set of points associated with a tissue object; and
calculating a tissue volume as a function of the set of points associated with the tissue object.

17. The method of claim 16, wherein:
the tissue volume comprises a tumor volume; and
the tissue object comprises a tumor.

18. The method of claim 16, wherein:
the tissue volume comprises an organ volume; and
the tissue object comprises an organ.

19. The method of claim 13, wherein:
generating the three-dimensional (3D) stack view comprises generating a graphical user interface, wherein the graphical user interface comprises:
the 3D stack view; and
a slide section selection field; and
displaying the 3D stack view through the display device comprises displaying the graphical user interface.

20. The method of claim 19, wherein displaying the 3D stack view through the display device further comprises:
receiving a user input through the slide section selection field, wherein the user input selects subset of the plurality of serial slide section images; and
updating the 3D stack view to display only the subset of the plurality of serial slide section images.

21. The method of claim 13, wherein:
generating the three-dimensional (3D) stack view comprises generating a graphical user interface, wherein the graphical user interface comprises:
the 3D stack view; and
a tissue object selection input mechanism; and
displaying the 3D stack view through the display device comprises displaying the graphical user interface.

22. The method of claim 21, wherein displaying the 3D stack view through the display device further comprises:
receiving a user input through the tissue object selection input mechanism; and
determining a tissue volume as a function of the user input.

23. The method of claim 13, wherein:
generating the three-dimensional (3D) stack view comprises generating an interpolated layer from a first slide of the plurality of slide images and a second slide of the plurality of slide images; and
displaying the 3D stack view comprises displaying the 3D stack view comprising the interpolated layer.

24. The method of claim 13, wherein displaying the 3D stack view through the display device comprises:
receiving a view angle input from the user; and
updating a display of the 3D stack view to correspond to the view angle input.

* * * * *